J. F. MURPHY.
METHOD OF MAKING METAL BASE CUTTING DIES.
APPLICATION FILED SEPT. 29, 1920.
1,420,276.
Patented June 20, 1922.
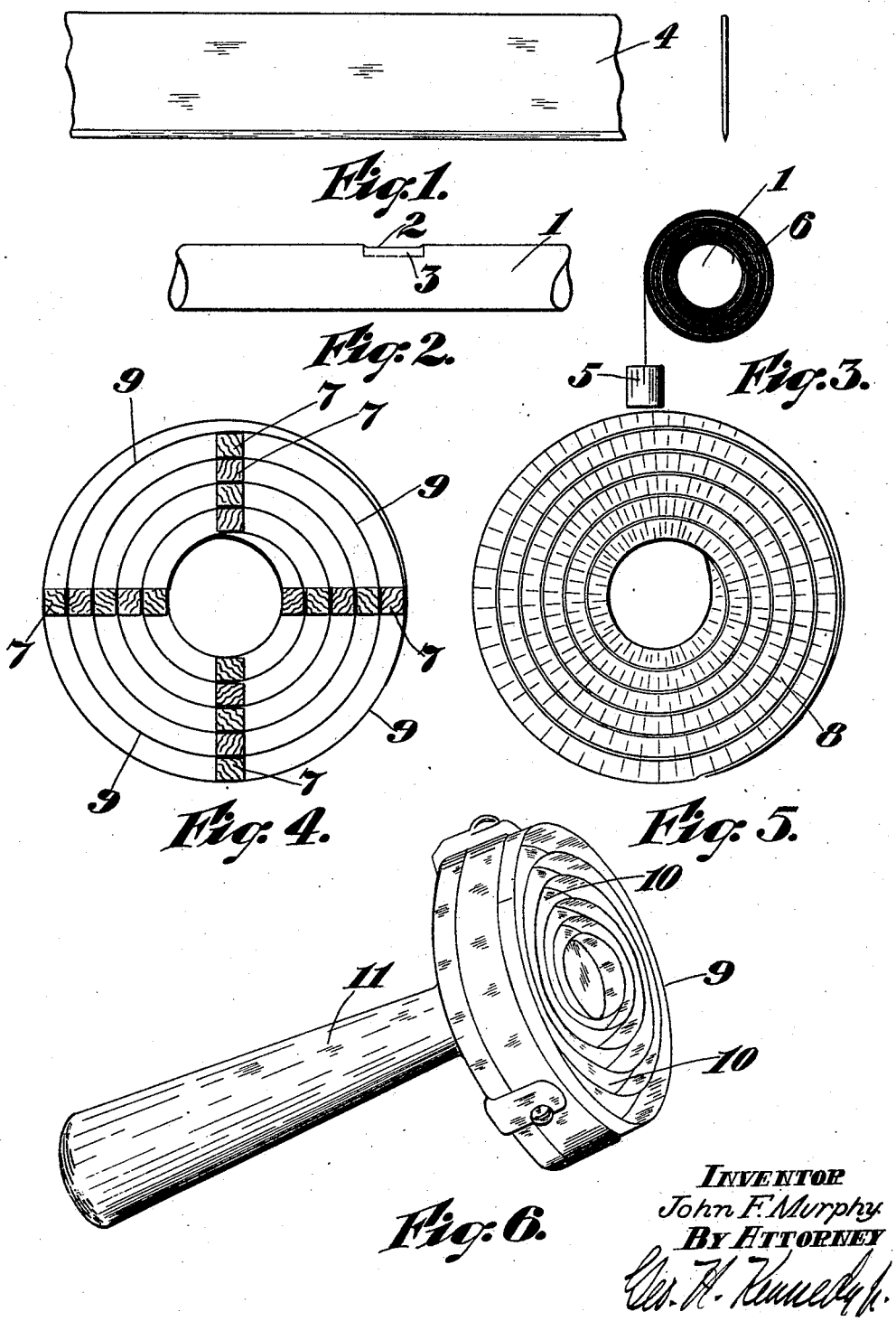

UNITED STATES PATENT OFFICE.

JOHN F. MURPHY, OF WORCESTER, MASSACHUSETTS, ASSIGNOR OF ONE-HALF TO HAMILTON B. WOOD, OF WORCESTER, MASSACHUSETTS.

METHOD OF MAKING METAL-BASE CUTTING DIES.

1,420,276. Specification of Letters Patent. Patented June 20, 1922.

Application filed September 29, 1920. Serial No. 413,641.

*To all whom it may concern:*

Be it known that I, JOHN F. MURPHY, a citizen of the United States, residing at Worcester, in the county of Worcester and Commonwealth of Massachusetts, have invented a new and useful Improvement in a Method of Making Metal-Base Cutting Dies, of which the following, together with the accompanying drawings, is a specification.

The present invention relates in general to the manufacture of dies, and in particular to an improved form of die in which the cutting blades are integrally and firmly embedded in a metallic backing or base.

In the previous manufacture of metal base dies, it has been impossible to provide a properly hardened and tempered cutting edge, owing to the fact that the operation of tempering the edge after the assembly of the blade in the base, would inevitably destroy such base or backing. By the present invention I propose to make such a die with a blade already tempered before the base or backing is cast, and to this end I have devised the mode of manufacture hereinafter set forth in detail in the accompanying specification, reference being had to the annexed drawings, wherein—

Fig. 1 is a fragmentary view of the metallic ribbon or blade material of the die.

Fig. 2 is a side view of an arbor or mandrel used in the preliminary process of imparting the desired shape to the die.

Fig. 3 is an end view showing the tempered blade material upon said mandrel, in the process of formation of a spiral die.

Fig. 4 is a plan view of the material after its removal from the mandrel, showing the use of spacers employed to give it an approximate form.

Fig. 5 is a side view of a templet or pattern which is fitted to the blade material preliminary to the operation of casting the base or backing.

Fig. 6 is a perspective view of the completed die, with the handle attached to the cast base or backing.

Like reference characters refer to like parts in the different figures.

For purposes of illustration, I have chosen to show the invention as applied to the manufacture of a spiral die, such as is used for cutting lacings and the like from rawhide or other suitable material; it is obvious, however, that the invention is applicable to a wide variety of different shapes of dies, for similar purposes, where the nature of the work requires a practically indestructible cutting device. The failure of previous dies of this type to stand up under hard usage is well recognized as due to the relative softness and lack of temper of the blade material, and it has heretofore been deemed impossible to correct this shortcoming because of the apparent necessity of working with a relatively soft untempered material, in order to impart thereto the desired shape.

I have discovered that a hard and well tempered blade material, if properly manipulated and treated, is susceptible of changes in shape and configuration to suit most die making purposes, and in particular I have discovered that in the manufacture of a spiral die, it is possible to wind such a material upon a mandrel or arbor, as indicated at 1 in Fig. 2, said arbor having a flattened surface 2 which is provided with a narrow slot 3, adapted to receive the end of the metallic tempered ribbon of blade material 4.

In carrying out my method of manufacture, the arbor 1 is rotatably mounted in any suitable support, and the tempered ribbon 4, of the desired length, with one end threaded into the slot 3, is put under a considerable tension, as by means of attaching a brake or weight thereto, as indicated at 5, Fig. 3. As the arbor 1 is slowly turned, for the purpose of winding up the ribbon thereon, said ribbon is subjected over the surface thereof, as it comes onto the arbor, to a thorough peening or hammering, of sufficient intensity and frequency to impart to the very gradually accumulating material on the arbor a permanent set. In the instance here selected for purposes of illustration, viz, a spiral die, the blade material, under this constant peening or hammering, takes the form of a tightly wound spiral spring, as indicated at 6, Fig. 3. When this operation is completed and all of the length of blade material has been so peened and hammered into shape, the entire winding is removed from the arbor.

Thereupon the convolutions of the coil are spread apart and spaced by the insertion of a plurality of removable blocks 7, the latter preferably being arranged radially in rows, from the center of the coil outwardly and acting to expand the convolutions in such a manner as to cause them to take on an approximate spiral form. It will be understood that for other forms and shapes of dies, the spacers 7 will be differently proportioned and inserted, the object being in any case to obtain an approximation of the final shape, in order to hold the blade material suitably expanded so as to permit the insertion of an accurately formed templet or pattern. Such a templet or pattern for such a spiral die is indicated by the reference numeral 8 in Fig. 5, the same being made preferably of laminated wood which is cut to a true spiral shape in a jig saw, or in any other suitable way. The pattern or templet 8 is forced into place between the cutting edges 9 of the approximately formed and fully tempered blade material, displacing the spacers 7, 7 which serve to keep the material expanded. With the pattern or templet 8 in place, the formed blade is in readiness for the casting of a backing or base 10, as will be well understood; this backing or base is preferably made of Babbitt metal, mixed with a suitable percentage of tin. The molten metal is allowed to flow between the adjacent portions of the back edges of the blade material, running into contact with the interior surface of the pattern or templet 8, which latter prevents any distortion of contraction of the blade material while the metal of the backing is cooling and hardening. When this is done, the templet or pattern 8 is destroyed and disintegrated as by plunging the assembly into boiling water, which acts to separate the wood laminations of the templet and render easy its removal from the die. Thereupon the die with its metal base or backing is inserted and suitably held in place in a handle or holder 11, in readiness for use.

I claim:

The herein described method of making a metal base die, which consists in widening and simultaneously peening a ribbon of tempered metal on an arbor, expanding said ribbon to the approximate shape desired by the insertion of removable spacers between adjacent portions thereof, forcing a templet or pattern of the true shape desired into place within the expanded ribbon, thereby displacing said spacers, casting a base to embed the edges of said ribbon that project beyond said templet and removing said templet.

Dated this 27th day of September, 1920.

JOHN F. MURPHY.